J. E. COGGON.
EXTRICATING DEVICE FOR MOTOR VEHICLES.
APPLICATION FILED JULY 12, 1920.
1,379,585.
Patented May 24, 1921.
3 SHEETS—SHEET 1.
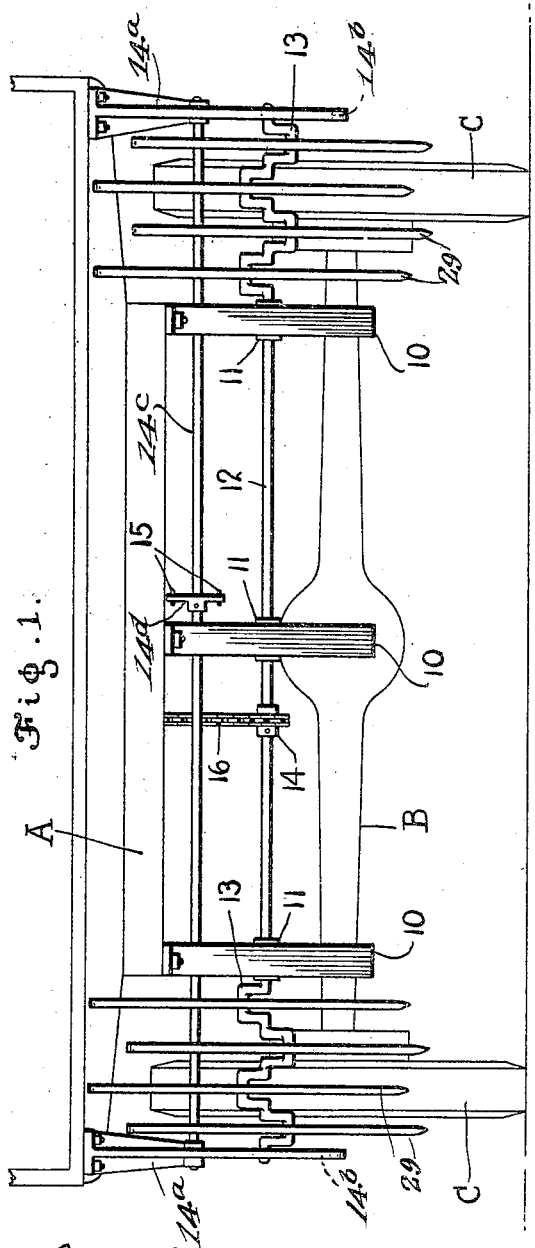
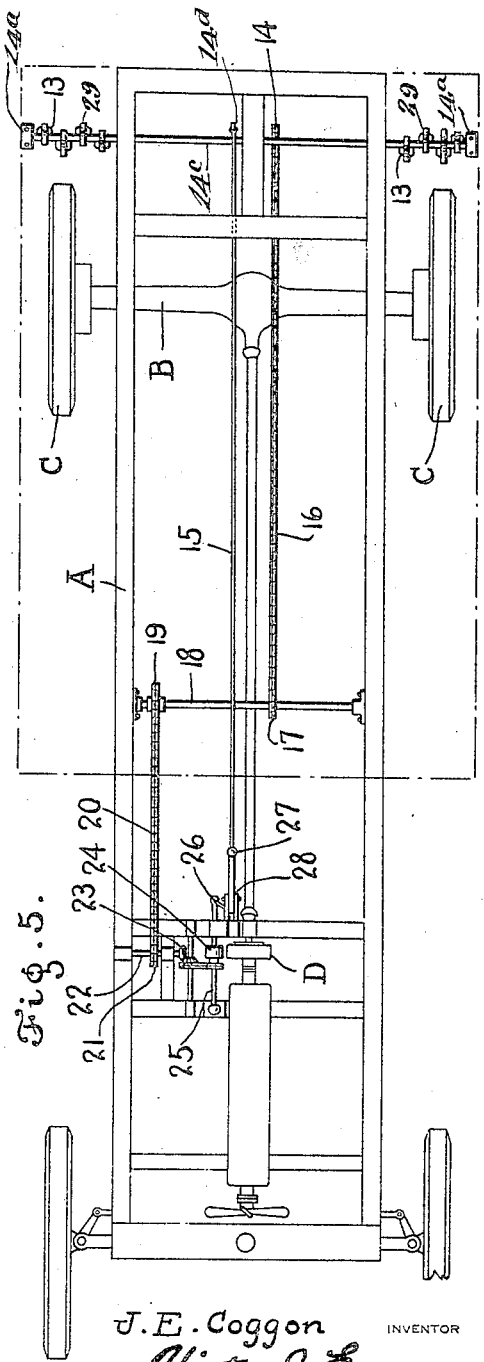
J. E. Coggon INVENTOR

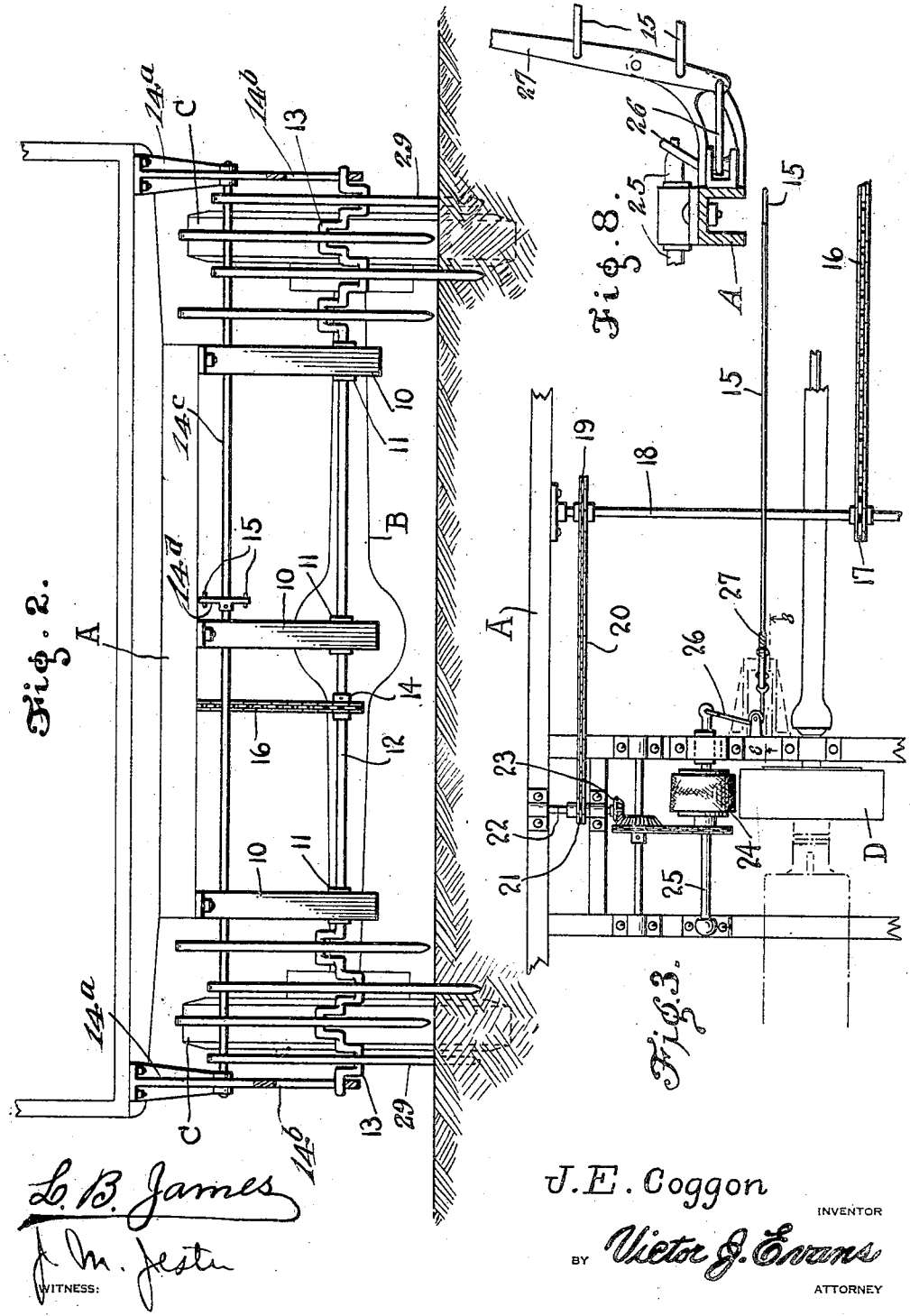

J. E. COGGON.
EXTRICATING DEVICE FOR MOTOR VEHICLES.
APPLICATION FILED JULY 12, 1920.
1,379,585.
Patented May 24, 1921.
3 SHEETS—SHEET 3.
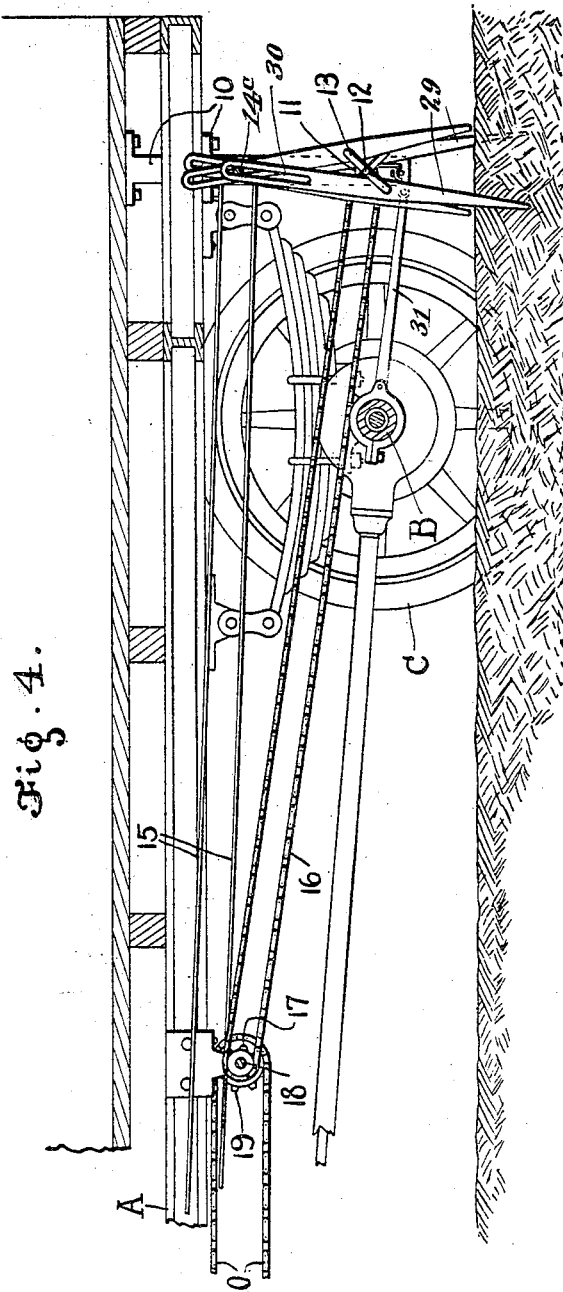
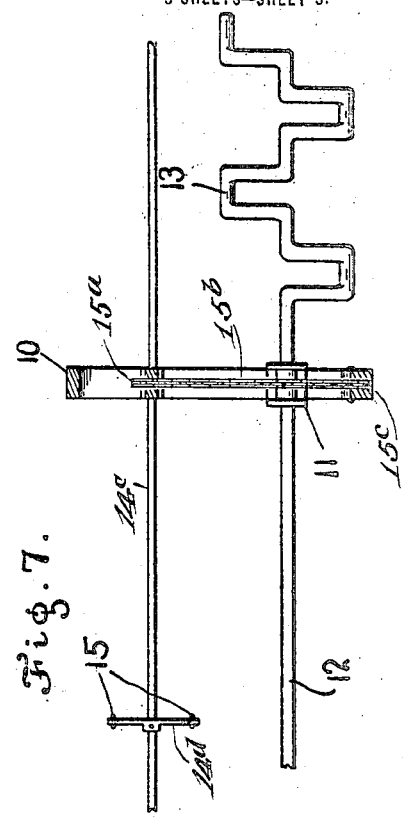
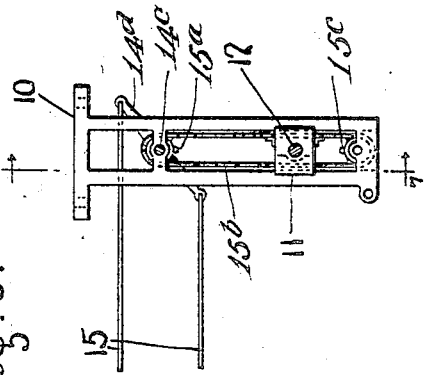
J. E. Coggon INVENTOR

UNITED STATES PATENT OFFICE.

JOHN E. COGGON, OF VIOLA, WISCONSIN.

EXTRICATING DEVICE FOR MOTOR-VEHICLES.

1,379,585.

Specification of Letters Patent.  Patented May 24, 1921.

Application filed July 12, 1920. Serial No. 395,671.

*To all whom it may concern:*

Be it known that I, JOHN E. COGGON, a citizen of the United States, residing at Viola, in the county of Richland and State of Wisconsin, have invented new and useful Improvements in Extricating Devices for Motor-Vehicles, of which the following is a specification.

This invention relates to devices for extricating or extracting motor vehicles which have become mired and has for its object the provision of a shaft member carried by arms slidably adjustably connected with the rear end of a motor truck, the shaft having crank portions adapted to be brought into engagement with the ground whereby to exert a powerful propelling action to force the truck forwardly through the mud, and driving means being provided connected with the motor mechanism of the truck and connected with said shaft.

An important object is the provision of a device of this character which forms a permanent part of and is normally carried in elevated position upon the rear end of a truck and which has associated therewith means whereby it may be lowered to bring the crank portions of the shaft into engagement with the ground so that they will exert their traction.

An additional object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is a rear elevation of a truck showing my device carried thereby and in inoperative position, Fig. 2 is a similar view showing my device moved downwardly into operative position, Fig. 3 is a plan view showing the motor control means for effecting the movement of my device, Fig. 4 is a longitudinal sectional view, Fig. 5 is a plan view of the complete device, Fig. 6 is a detail view showing the stepper elevating means, and Fig. 7 is a sectional view on the line 7—7 of Fig. 6.

Referring more particularly to the drawings, the letter A designates the chassis of a motor truck, B designates the rear axle, C the rear wheels, and D the fly-wheel of the motor or a similar device associated therewith.

In carrying out my invention I provide upon the rear end of the truck suitable guides 10 within which are slidably mounted supporting members 11 which carry a shaft 12 having its end portions formed with a plurality of crank portions 13. Secured upon the shaft intermediate its ends is a sprocket 14.

The numeral $14^a$ designates depending brackets, the lower ends of which are formed with slots $14^b$ within which the extremities of the shaft 12 are slidably engaged. Journaled through the brackets $14^a$ is a rock shaft $14^c$ carrying arms $14^d$ to which are connected flexible members 15 which extend forwardly of the truck and which are connected with means whereby either member 15 may be pulled to rock the shaft $14^c$. Secured upon the shaft $14^c$ within the guides 10 are sprockets $15^a$ about which are trained chains $15^b$ which are also trained about sprockets $15^c$ journaled at the lower ends of the members 10. These chains $15^b$ pass through the slidable bearing members 11 and are secured thereto at one side so that when the shaft $14^c$ is rocked and the chains $15^b$ consequently moved the bearing members 11 will be moved up or down as the case may be carrying with them the shaft 12.

Associated with each end of the shafts 12 and $14^c$ are steppers 29 arranged in groups, there being one stepper for each crank portion 13. These steppers are provided with holes through which the crank portions 13 pass and have their upper ends formed with slots 30 slidably engaged upon the shaft $14^c$. It might be mentioned that suitable brace means 31 is provided connected with the rear axle B and connected with the lower ends of the members 10 for producing a rigid structure.

Trained about the sprocket 14 is a chain 16 which is in turn trained about a sprocket 17 on one end of a counter-shaft 18 journaled transversely of the truck frame and this shaft 18 carries a sprocket 19 about which is trained a chain 20 trained about a sprocket 21 on a short shaft 22 journaled at the front portion of the truck. This shaft 22 is operatively connected by gearing 23 with a friction roller 24 carried upon a pivoted shaft 25 and movable into engagement with the fly-wheel or kindred device D. The shaft 25 has connected therewith a cord or other flexible member 26 with which is connected one end of a pivoted lever 27 with which may be associated a segmental rack 28.

In the operation of the device it will be seen that under ordinary conditions my extricating device is supported in elevated position at the rear end of the truck with the steppers 29 out of engagement with the ground. In case the truck becomes mired it is merely necessary that the operator pull upon the lever or other device connected with one of the members 15 and thus rock the shaft 14ᶜ which will cause the members 11 and shaft 12 carrying the steppers to be lowered so that the steppers will engage the ground. The lever 27 is then swung to bring the friction roller 24 into engagement with the fly-wheel D whereupon the shaft 22 will be rotated and this will cause rotation of the shaft 12. As the shaft 12 rotates the crank portions 13 at the ends thereof will cause the steppers 29 to have a walking action and to bite into the ground which will cause the device to be propelled so that the truck will be extricated from a mud hole. When the use of the device is not desired it is of course readily apparent that by drawing upon the other member 15 the device may be elevated to bring the steppers 29 out of engagement with the ground.

From the foregoing description and a study of the drawings it will be apparent that I have thus provided a simply constructed and consequently inexpensive device which may be readily installed upon a truck and which is readily adapted for use in extricating the device from mud, the device being easily thrown into or out of operative position and being driven by the truck driving mechanism.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. In combination with a motor truck, an extricating device comprising guide members depending from the rear portion of the truck, a horizontal shaft slidably mounted within said guides and having its end portions formed with cranks, a second shaft journaled above said first named shaft, a plurality of steppers mounted upon said crank portions and having their upper ends slidably and rockably engaged upon said second named shaft, means for raising and lowering said first named shaft, and means for turning said first named shaft, said raising and lowering means comprising sprockets secured upon said second named shaft, other sprockets journaled at the lower ends of said guides, chains trained about corresponding ones of said sprockets and connected with said slidable support, and means for rocking said second named shaft.

2. In combination with a motor truck, an extricating device comprising guide members secured upon the rear end of the truck, a support vertically slidably mounted with respect to said guide members and carrying a shaft having its end portions provided with ground engaging members, means for raising or lowering said support and consequently said shaft whereby to dispose said ground engaging members in or out of engagement with the ground, and power driven means for rotating said shaft comprising a counter-shaft operatively connected with said shaft, a pivoted shaft carrying a friction roller engageable with the fly-wheel of the motor truck, said pivoted shaft being operatively connected with said counter-shaft whereby to effect rotation of the latter, and means for moving said friction roller into engagement with the fly-wheel comprising a lever connected with the arm on said pivoted lever and movable over a segmental rack.

In testimony whereof I affix my signature.

JOHNIE E. COGGON.